United States Patent [19]

Garneweidner

[11] Patent Number: 4,995,486
[45] Date of Patent: Feb. 26, 1991

[54] IMPACT ABSORBER FOR A MOTOR VEHICLE

[75] Inventor: Peter Garneweidner, Salzburg, Austria

[73] Assignee: Austria Metall Aktiengesellschaft, Salzburg, Austria

[21] Appl. No.: 414,143

[22] Filed: Sep. 28, 1989

[30] Foreign Application Priority Data

Sep. 28, 1988 [AT] Austria .................. 2394/88

[51] Int. Cl.$^5$ .................................. F16F 7/12
[52] U.S. Cl. ........................ 188/374; 74/492; 293/133
[58] Field of Search ............ 188/371, 324; 293/133; 74/492

[56] References Cited

U.S. PATENT DOCUMENTS

| 2,251,347 | 8/1941 | Williams et al. | 293/133 X |
| 3,186,664 | 6/1965 | Schultz | 188/374 |
| 3,398,812 | 8/1968 | Peterson | 188/374 |
| 3,482,653 | 12/1969 | Maki et al. | 74/492 X |
| 3,717,046 | 2/1973 | Takao et al. | 188/374 X |
| 3,887,223 | 6/1975 | Bez | 188/371 X |
| 3,899,047 | 8/1975 | Maeda et al. | 293/133 X |
| 4,181,198 | 1/1980 | Lindberg | 188/371 |

FOREIGN PATENT DOCUMENTS

| 2129138 | 12/1972 | Fed. Rep. of Germany . |
| 2164894 | 7/1973 | Fed. Rep. of Germany . |
| 2201952 | 7/1973 | Fed. Rep. of Germany . |
| 2441557 | 3/1976 | Fed. Rep. of Germany . |
| 2460598 | 6/1976 | Fed. Rep. of Germany . |
| 2825460 | 1/1979 | Fed. Rep. of Germany . |
| 2181044 | 11/1973 | France . |
| 2394422 | 1/1979 | France . |

Primary Examiner—George E. A. Halvosa
Attorney, Agent, or Firm—Herbert Dubno

[57] ABSTRACT

An impact absorber for a motor vehicle comprises a pair of telescopingly interfitted tubes which receive the impact energy axially and in which either the inner or outer tube is plastically deformed as the tubes are telescopingly contacted by the impact force. The outer tube receives a smaller diameter portion of the inner tube at one end and the outer tube projects at this end to have a large diameter portion whose diameter is greater than the inner diameter of the outer tube and is connected to the small diameter portion by a conical transition region.

1 Claim, 3 Drawing Sheets

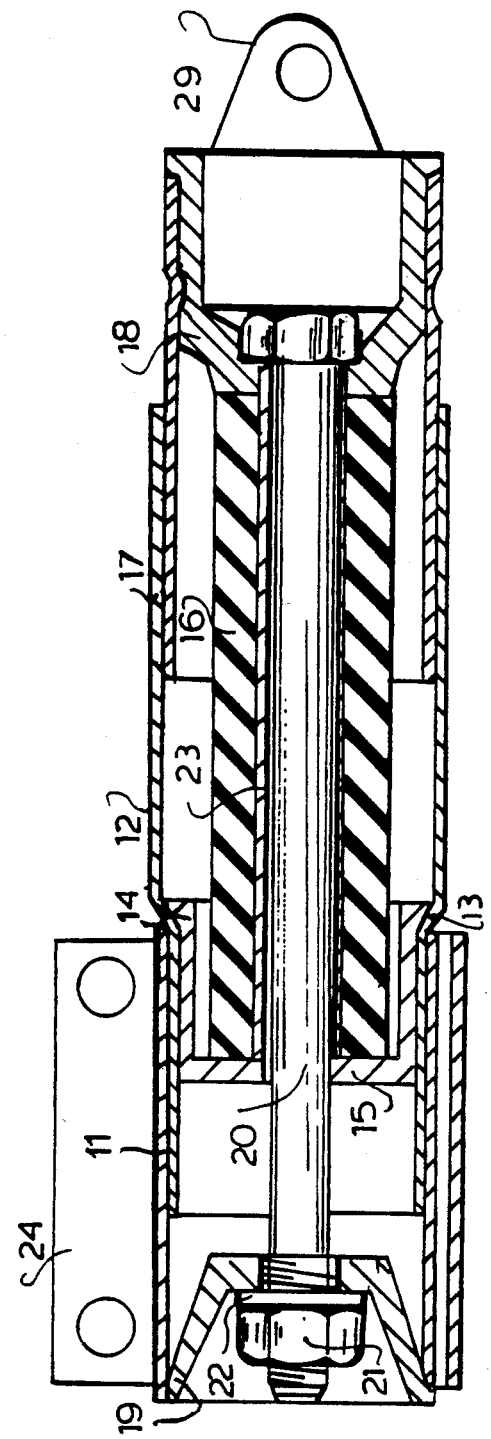
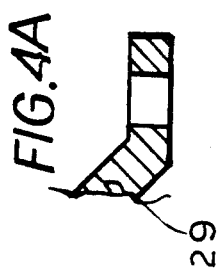
FIG.4
FIG.4A

IMPACT ABSORBER FOR A MOTOR VEHICLE

FIELD OF THE INVENTION

My present invention relates to an impact absorber for a motor vehicle and, more particularly, to an impact absorber of the type which is capable of dissipating energy of a collision by the deformation of one of two telescopingly interfitting tubes namely an outer tube and at least one inner tube.

BACKGROUND OF THE INVENTION

Known impact absorbers of the telescoping tube type generally function so that, in the case of a collision, the inner tube is forced into the outer tube or the outer tube is forced over the inner tube (or both) and an elastic material or the like within the tubes can be subjected to compression and is thus capable of generating a resistance to this telescoping shifting of the two tubes.

The elastic material, for example, can be received in the outer tube and can have the form of the inner tube or it can be received in partition between a partition or bulkhead and a wall of the tubes or in a sheath within the tubes.

An oil filling can also be provided for the tubes which may be displaced upon the telescoping contraction of the interfitted tubes.

A drawback of all of these earlier constructions is that, by and large, there is no constant resistance to the telescoping contraction of the tube assembly, but rather the resistance thereto progressively increases. In the case of an oil filling, where it is possible to provide a constant resistance, other problems arise, e.g. problems of sealing.

A constant resistance to the telescoping contraction of the tube assembly is desirable when the elastic spring stiffness of the vehicle chassis is to be fully utilized from the beginning of a collision process.

OBJECTS OF THE INVENTION

It is, therefore, the principal object of the present invention to provide an impact absorber for a motor vehicle and especially a collision impact absorber which can avoid the drawbacks of the earlier systems described above.

Another object of this invention is to provide a low cost, simple and reliable impact absorber which can provide a substantially constant resistance with increasing telescoping tube contraction, with impact and such that oil leakage does not pose a problem.

SUMMARY OF THE INVENTION

These and other objects of the invention are attained, in accordance with the invention, in a system in which a telescoping tube arrangement is provided between the vehicle chassis and the source of collision, e.g. between a bumper of the vehicle and the vehicle chassis and the telescoping tube arrangement comprises an outer tube and at least one inner tube received in the outer tube. According to the invention, the inner tube projects axially from an end of the outer tube and at this end has a larger outer diameter than the inner diameter of the outer tube at least at this end.

As a consequence, upon a collision which generates a force tending to drive the inner tube into the outer tube, at least one of the tubes tends to change in diameter and by the deformation of this latter tube, a resistance to the telescoping contradiction is created which remains constant during the contraction.

The tube which deforms will, of course, depend upon the dimensioning of the assembly and specifically the thickness relationship of the tubes. For instance, if the outer tube is dilated by being driven onto the inner tube, it is likely that the inner tube will have a greater thickness than the outer tube. If, of course, the inner tube is swaged or constricted by the telescoping contraction it is likely that the thickness of the inner tube will be less than that of the outer tube.

Whether the inner tube is swaged or constricted or the outer tube is dilated, or both of these occur simultaneously, the change will provide a substantially constant resistance to the axial telescoping of the tubes.

Of course it will be understood that the force required for deforming the deformable tube can be caused to progressively increase or increase in steps by correspondingly varying the wall thickness of the deformable tube.

Advantageously, the transition zone between the portion of the inner tube within the outer tube and the portion of larger diameter can be provided as a transition region of a conical configuration. This transition region serves as the region at which deformation primarily occurs.

In practice it has been found that this frustoconical transition zone forms a uniform deformation of the deformable tube over the entire circumference thereof and there is little if any binding or tearing of either of the tubes because of non-uniform deformation.

The two telescopingly interfitted tubes can have a bottom, a sheath or a bulkhead or partition defining a compartment which progressively decreases in volume and containing an elastically deformable material if desired and in accordance with a feature of the invention.

This construction can be used when it is desired to provide a certain elastic deformation of the impact absorber between the plastic deformation which results from the deformation of the deformable tube, i.e. the construction of the inner tube or the dilation of the outer tube.

For example, for light contact which can result from a parking collision, for instance, a purely elastic telescoping action can be provided to absorb such energy. However, for greater impacts that may be harmful to the vehicle, the elastic deformation of the tube assembly can give rise to a plastic deformation with increased energy dissipation and the preferably uniform resistance to telescoping contraction of the telescoping assembly.

According to another feature of the invention, the impact damper is so formed that one of the two cooperating tubes is provided with a circumferential reinforcement positioned to ensure that the deformation takes place at only one of the two tubes.

In a simplified construction of the impact absorber it has been found to be advantageous to provide within the inner tube at the diameter transition, a reinforcing disk in circumferential contact with the frustoconical region and to brace it by means of a screw arrangement against the outer tube. The screw arrangement can be a tie rod traversing the outer tube.

In another construction, the outer tube can be formed at its outer end with a bottom in which the inner tube is braced against the outer tube by a screw, bolt or tie rod extending along the tube axis.

This bolt or rod not only stresses the parts against one another but can provide a prestress on the tubes which can generate an incipient deformation and thereby make any subsequent deformation more uniform and localized to the desired transition region.

BRIEF DESCRIPTION OF THE DRAWING

The above and other objects, features and advantages of my invention will become more readily apparent from the following description, reference being made to the accompanying highly diagrammatic drawing in which:

FIG. 4 is an axial section through another embodiment; and

FIG. 4A is a cross sectional view through the lug of FIG. 4.

SPECIFIC DESCRIPTION

Figure 1:
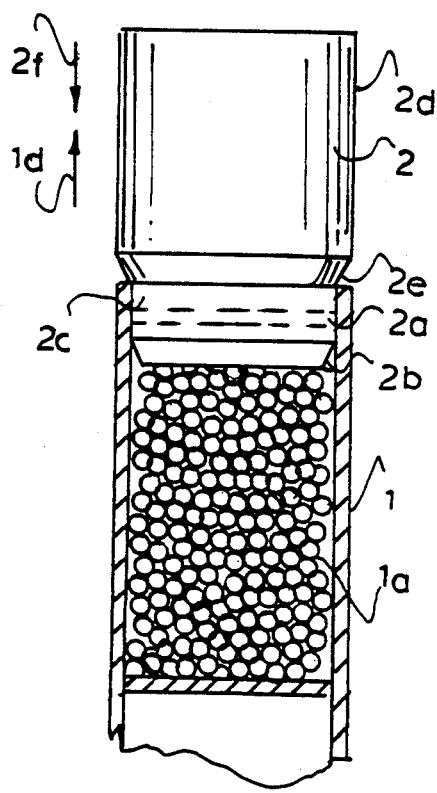
FIG. 1 is a cross section view diagrammatically illustrating the principle of the present invention.
Figure 2:
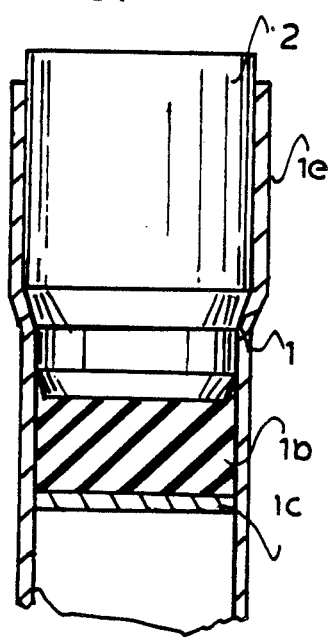
FIG. 2 is a view similar to FIG. 1 showing the assembly of FIG. 1 telescopingly contracted as by the impact of a collision.

In FIGS. 1 and 2, I have shown the principles of the present invention and from FIG. 1 it will be apparent that initially the assembly of the inner tube 2 and the outer tube 1 is in an extended position.

The outer tube 1 is here shown to be of constant diameter and to be filled with an elastic filling 1a which can be resiliently compressible to a more dense form 1b (compare FIG. 2) although this filing is by no means necessary. If the filling is provided, it may be received between partitions or bulkheads 1c and 2c, respectively.

The outer tube 2 initially has a bevelled leading end 2b to enable it to be inserted with ease into the open end of the outer tube 1.

It has a small diameter portion 2c with an outer diameter substantially equal to the inner diameter of the outer tube and force fitted into the latter. Between the small-diameter portion 2c of the inner tube 2 and the large diameter portion 2d of the inner tube 2, is a conical transition region 2e.

The large diameter portion 2d of the inner tube projecting beyond the end of the outer tube 1 has a diameter in excess of the inner diameter of the outer tube and, in the embodiment illustrated, substantially equal to the outer diameter of the outer tube 1.

In the embodiment illustrated in FIGS. 1 and 2, moreover, it will be assumed that the outer tube 1 is connected to the chassis of the motor vehicle and the inner tube 2 to a bumper thereof by conventional means and that the outer tube 1 has a smaller wall thickness than the inner tube 2 so that the principal permanent deformation is a dilation of the outer tube 1.

Assuming that the tube 2 is not as fully inserted into the outer tube 1 as is shown in FIG. 1 initially, it can be seen that the initial effect of an impact resulting in relative movement of the tubes as shown by the arrows 1d and 2f, for example, will be an elastic deformation of the tubes and any filling 1a confined therebetween.

With a greater impact, however, and with the tubes in the position shown in FIGS. 1 and 2, the large diameter portion 2d is forced into the outer tube 1 widening the latter as is clearly apparent from a comparison of FIGS. 1 and 2.

The force required for deforming the outer tube 1 in the region 1e is, of course, dependent upon the wall thickness of the outer tube 1 and for a constant wall thickness of this outer tube, is constant during the progress of the collision.

By proper choice of the wall thickness ratio between the outer and inner tubes, either the inner tube or the outer tube can be the deformed tube.

By selection of a greater or lesser conicity angle of the transition region 2e, the force required to deform the outer tube can be varied as well.

Of course, after the telescoping tube arrangement of FIGS. 1 and 2 has been deformed in the manner illustrated in FIG. 2 and has absorbed the collision impact or the impact energy, it can be replaced by an undeformed, noncontracted assembly and the assembly of tubes 1 and 2 can be discarded.

Figure 3:
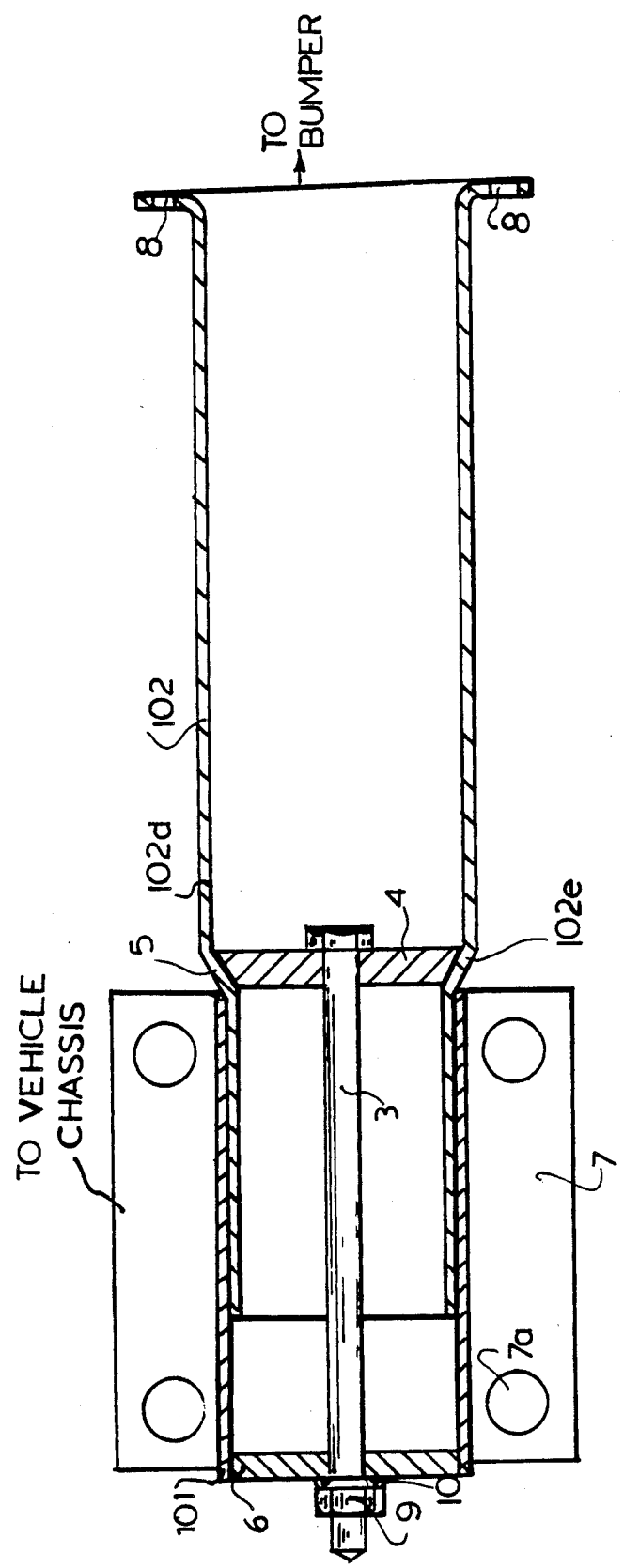
FIG. 3 is an axial section through an embodiment of the impact absorber.

FIG. 3 illustrates a simple embodiment employing this principle which comprises an outer tube 101 and an inner tube 102 which are telescopingly interfitted and can be telescopingly contracted in the manner described in connection with FIGS. 1 and 2 by the impact.

A screw or bolt 3 passes through a conical disk 4 which has a conical surface 5 lying at the transition region 102e as a reinforcement for the latter. A nut 9 and a washer 10 brace a disk 6 against an end face of the outer tube 101, the disk 6 serving to close the left hand end of the latter.

The tube may be mounted by a plate 7 formed with holes 7a adapted to be traversed by screws, to the carriage. The tube 102 can be formed at its ends with bores 8 which can be connected by bolts and nuts to the bumper (not shown).

In operation, of course, the embodiment of FIG. 3 operates in a manner similar to that of FAGS. 1 and 2 in that the outer tube 1 is force over the inner tube 2 at its large diameter portion 102d via the transition region 102e. In this case, the reinforcing disk 104 and its surface 5 at the transition ensures that the inner tube, in spite of its small wall thickness, will not be constricted by the telescoping action.

FIGS. 4 and 4A illustrate an embodiment which comprises an outer tube 11 receiving an inner tube 12. Within the inner tube 12, an end tube 17 is fitted.

The part of the inner tube 12 projecting outwardly beyond the outer tube 11 is braced against the inner tube 11 at the conical transition region 13. In the region of this transition region and along a portion of its length extending into the outer tube 11, the inner tube 12 is provided with a reinforcing sleeve 14 which ensures that, upon telescoping contraction of the tube assembly, a widening of the outer tube 11 will occur.

The reinforcing sleeve 14 has a bottom 15 against which an elastic sleeve or sheath 16 is braced. The other end of the sheath 16 of elastic material is braced against an impact shield attachment 18 having a lug 29 for affixing it to a bumper.

The tubes 11, 12 and 17 are drawn together by the bolt 20, a nut 21 and a washer 22.

The bolt 20 lies along the axis of the telescoping tube assembly and is anchored in the attachment 18 and in a conical closure member 19 braced against the opposite end of the outer tube 11. An axially compressible compression sleeve 23 is braced against the bottom 15 of the reinforcement 14 and against the head of the bolt 20 and presses the inner tube 12 against the outer tube 11 via the reinforcement 14. To attach the impact absorber to the body of the vehicle, a connecting plate 24 is provided. It will be apparent that the device of FIG. 4 operate in the same manner as has been described in connection with FIGS. 1 and 2 in that upon impact, the outer tube 11 is widened as the inner tube 12 is driven into it so that the energy of the impact is dissipated with a substantially constant resistance to the telescoping of the two tubes together and a progressive resistance increase being provided by the compression of the elastic material 16 as the tube 17 is driven into the tube 12.

I claim:

1. An impact absorber for a motor vehicle comprising:

an outer tube and at least one inner tube, said inner tube having a small diameter portion received in said outer tube and a large diameter portion disposed outside said inner tube at one end thereof, said large diameter portion having an outer diameter greater than an inner diameter of said outer tube at said end, whereby upon the application of a collision force axially to said tubes, said tubes are telescopingly contracted by permanent deformation of at least one of said tubes as said large diameter portion is driven into said outer tube, said inner tube being formed with a transition region of conical configuration between said large diameter portion and said small diameter portion of said inner tube;

means confining a space between said tubes which is reduced inn volume upon telescoping contraction of said tubes;

an elastic material received in said space;

means providing a circumferential reinforcement bracing one of said tubes at said transition region, thereby confining deformation to the other of said tubes;

said reinforcement being a member received in said inner tube and braced against an inner surface of said transition region; and bolt means bracing said member against said outer tube, said outer tube being provided with a further member braced against an end thereof opposite said first mentioned end and said bolt bridges said members and draws said members together.

* * * * *